United States Patent

Jin et al.

[11] Patent Number: 5,627,924
[45] Date of Patent: May 6, 1997

[54] ARTICLE COMPRISING A NON-MECHANICAL OPTICAL FIBER SWITCH

[75] Inventors: Sungho Jin, Millington, N.J.; James J. Royer, Hanover Township, Northampton County, Pa.; Thomas H. Tiefel, North Plainfield, N.J.

[73] Assignee: Lucent Technologies Inc., Murray Hill, N.J.

[21] Appl. No.: 588,478

[22] Filed: Jan. 18, 1996

[51] Int. Cl.$^6$ .................................................. G02B 6/26
[52] U.S. Cl. .................. 385/16; 385/22; 385/23; 359/280
[58] Field of Search .................. 359/280–283; 385/16–23

[56] References Cited

U.S. PATENT DOCUMENTS

| | | | |
|---|---|---|---|
| 4,251,293 | 2/1981 | Jin | 148/101 |
| 4,671,621 | 6/1987 | Dillon, Jr. et al. | 350/403 |
| 4,812,767 | 3/1989 | Taketomi | 324/244 |
| 5,408,548 | 4/1995 | Olmstead | 385/16 |
| 5,512,193 | 4/1996 | Shirai et al. | 359/280 |
| 5,521,741 | 5/1996 | Umezawa et al. | 359/281 |

OTHER PUBLICATIONS

"Optical Fiber Switch Driven by PXT Bimorph", by Y. Ohmori et al., *Applied Optics*, vol. 17, No. 22, p. 3531 (1987).

"Magnetooptical 2×2 Switch For Single-Mode Fibers", by M. Shirasaki et al., *Applied Optics*, vol. 23, No. 19, pp. 3271–3276; Oct. 1, 1984.

"Deformation–Induced Anisotropic $C_r$–$C_o$–$F_e$ Permanent Magnet Alloys", by S. Jin, *IEEE Transactions on Magnetics*, vol. MAG–15, No. 6, Nov. 1979, pp. 1748–1750.

*Primary Examiner*—John Ngo
*Attorney, Agent, or Firm*—Eugen E. Pacher

[57] ABSTRACT

A novel non-mechanical optical fiber switch contains a magneto-optic element and a tubular magnet. The magneto-optic element is disposed within the field of the magnet but outside of the magnet bore. The beam of radiation from the switch input to the switch output passes through the axial bore of the magnet. The magnet contains magnetically anisotropic material, preferably a deformation-aged alloy having Fe, Cr and Co as major constituents. The switch is advantageously used in optical fiber communication systems.

12 Claims, 3 Drawing Sheets

TOP VIEW

TOP VIEW

SIDE VIEW

TOP VIEW

SIDE VIEW

ARTICLE COMPRISING A NON-MECHANICAL OPTICAL FIBER SWITCH

FIELD OF THE INVENTION

This invention pertains to non-mechanical optical fiber switches, typically remotely controllable switches, and to articles and systems (collectively "articles") that comprise such switches.

BACKGROUND OF THE INVENTION

Optical fiber communication systems frequently comprise one or more switches that can change the optical path, e.g., to select transmission lines. Most prior art optical fiber switches contain moving parts, and consequently are relatively slow and mechanically complex. See, for instance, Y. Ohmori et al., *Applied Optics*, Vol. 17 (22), p. 3531 (1978).

These drawbacks are largely overcome by non-mechanical switches such as the magneto-optical switch of M. Shirasaki et al., *Applied Optics*, Vol. 23 (19), p. 3271 (1984). The prior art switch comprises a 45° Faraday rotator consisting of a thin YIG (yttrium iron garnet) plate and an electromagnet with a core of semihard magnetic material. As can be seen from FIG. 4 of the Shirasaki reference, the core is a gapped annular ring, with the YIG plate disposed in the gap. This configuration has some disadvantages. Among the disadvantages are bulkiness, relatively complicated shaping of the magnet core, and relatively high profile.

In view of the importance of non-mechanical optical fiber switches for optical fiber communication systems and other applications, it would be highly desirable to have available a more robust switch of more convenient geometry. This application discloses such a switch.

A commercially available optical isolator comprises a permanent magnet (SmCo) with a square or rectangular cross section axial bore. A YIG member is sandwiched between two rutile wedges, and the combination is inserted into the bore of the magnet. See FIG. 1 for a schematic representation of the prior art isolator. As is understood by those skilled in the art, an optical isolator is not a switch but is a non-reciprocal element that transmits radiation in one direction only.

SUMMARY OF THE INVENTION

In a broad aspect the invention is embodied in an article that comprises a non-mechanical optical fiber switch including a magneto-optic element and a permanent magnet that is effective for applying a magnetic field to the element. Significantly, the magnet is a tubular magnet having an axial bore, and the magneto-optic element is disposed outside of the bore. In preferred embodiments the tubular magnet comprises magnetically anisotropic material, selected such that the remanent induction ($B_r$) is at least 10 kG, and the coercivity ($H_c$) is in the range 100 to 300 Oe (all at 20° C.).

In a particular embodiment the optical fiber switch radiation-transmissively connects a switch port of a first type with one of two switch ports of a second type. The ports of the second type are spaced from each other and are facing the port of the first type. The switch further comprises radiation path-affecting means disposed between the ports of the first and second type, the means being effective for switchably directing radiation between the port of the first type and one or the other of the ports of the second type. The means comprise a magneto-optic element and a magnet that is effective for applying a magnetic field to the magneto-optic element.

Significantly, the magnet is a tubular magnet having an axial bore, disposed such that the radiation paths between the ports of the first and second types pass through the axial bore. The magneto-optic element is disposed outside of the bore of the magnet. The magnet comprises magnetically anisotropic material having, at 20° C., a coercivity $H_c$ in the range 100–300 Oe and a remanent induction $B_r$ of at least 10 kG.

In some embodiments (e.g., optical fiber communication system with alternate transmission path; see FIG. 8) the port of the first type is the input port, with the ports of the second type being the output ports. In some other embodiments (e.g., optical fiber communication system with optical fiber amplifier, with an active and a stand-by pump laser; see FIG. 9) the port of the first type is the output port, and the ports of the second type are the input ports. The active port of the second type depends on the magnetization direction of the magnet. The magnetization direction is switchable between parallel and antiparallel with the direction of propagation of the radiation through the switch. Typically, the tubular magnet is surrounded by a solenoidal electromagnet, and means are provided for flowing a current (typically a current pulse, e.g., from a capacitor discharge) through the electromagnet. The solenoid and the current are selected such that the resulting switching field switches the magnetization direction of the tubular magnet. Thus, a switch according to the invention will typically comprise means for providing a switching current, e.g., a capacitor and a conventional electrical switch. The electrical switch may be remotely controlled, or may be controlled locally, e.g., by means of a locally disposed sensor. The switch according to the invention thus in one embodiment, is remotely controllable.

In currently preferred embodiments the tubular magnet consists substantially of an anisotropic deformation-aged alloy having Fe, Cr and Co as major constituents, but with the presence of minor amounts (typically individually less than 2% by weight, collectively less than 6% by weight) of other elements not precluded. The alloy typically has 7% by weight or less Co content, and deskably has $B_r \geq 10$ kG, and $H_c$ in the range 100–300 Oe. Furtherefore, in currently preferred embodiments the tubular magnet has relatively high (exemplarily >2) aspect ratio (length/outside diameter), and consequently has relatively low demagnetization factor, with relatively high magnetic flux for a given amount of magnetic alloy.

DETAILED DESCRIPTION OF A PREFERRED EMBODIMENT

Figure 1:
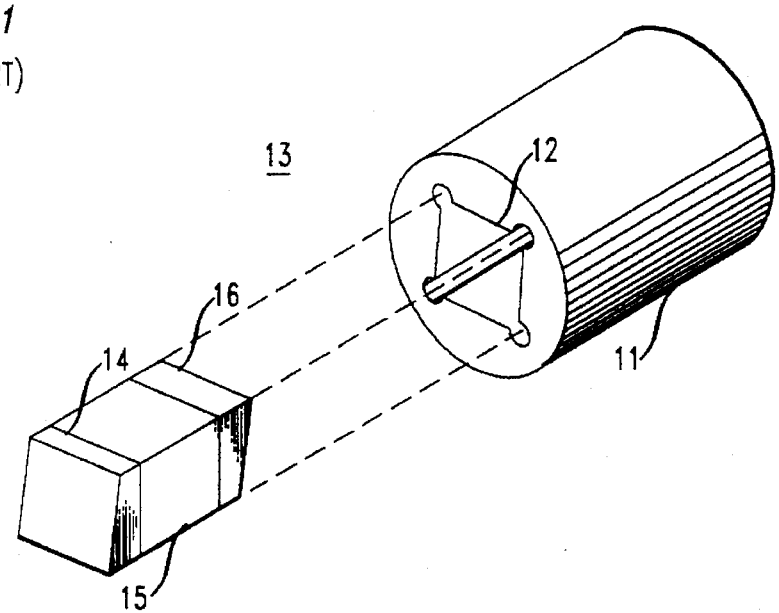
FIG. 1 schematically illustrates relevant features of a prior art Faraday rotator.

FIG. 1 schematically shows relevant aspects of a prior art Faraday isolator. Numerals 11 and 12 refer, respectively, to a cylindrical permanent magnet (such as a Sm-Co-based magnet with high coercivity, typically >5 kOe) and a square or rectangular cross section axial bore in the magnet, the bore being adapted for receiving assembly 13. The assembly consists of futile wedges 14 and 16, and YIG Faraday rotator 15, with the latter to be disposed within the bore of the magnet.

Figure 2:
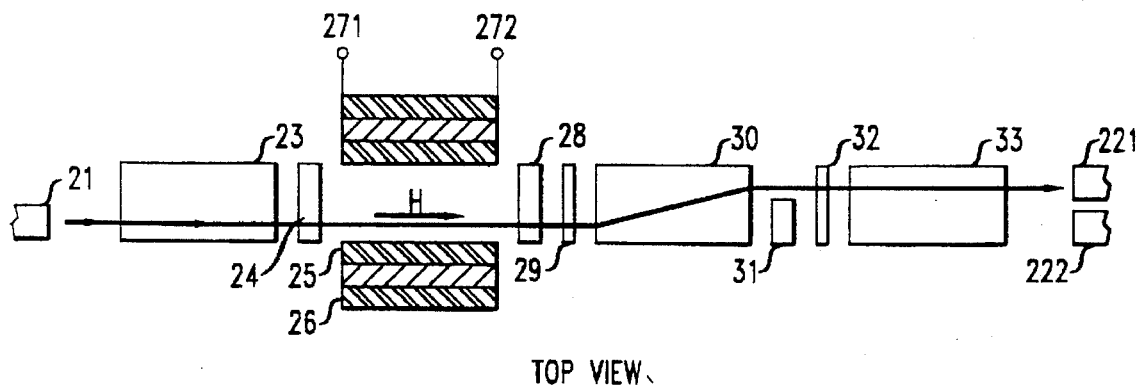
FIGS. 2–5 schematically depict an exemplary switch according to invention, with FIGS. 2 and 3 showing the switch in one position, and 4 and 5 showing it in the other position.
Figure 3:
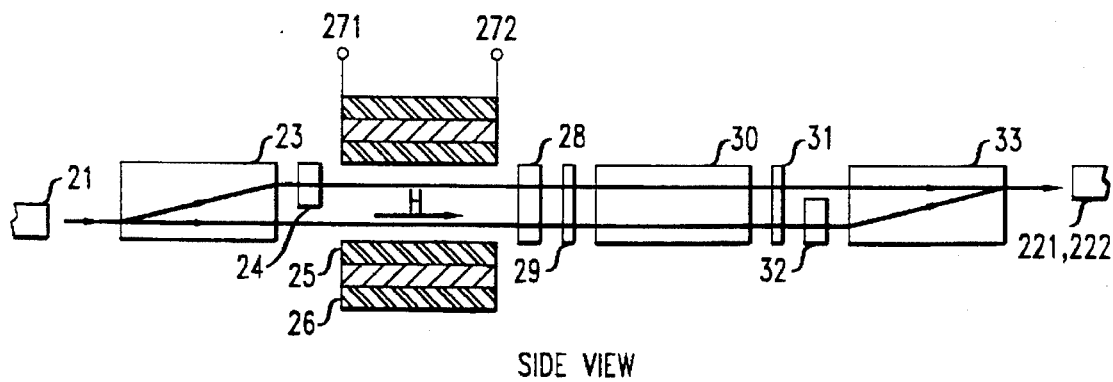
Figure 4:
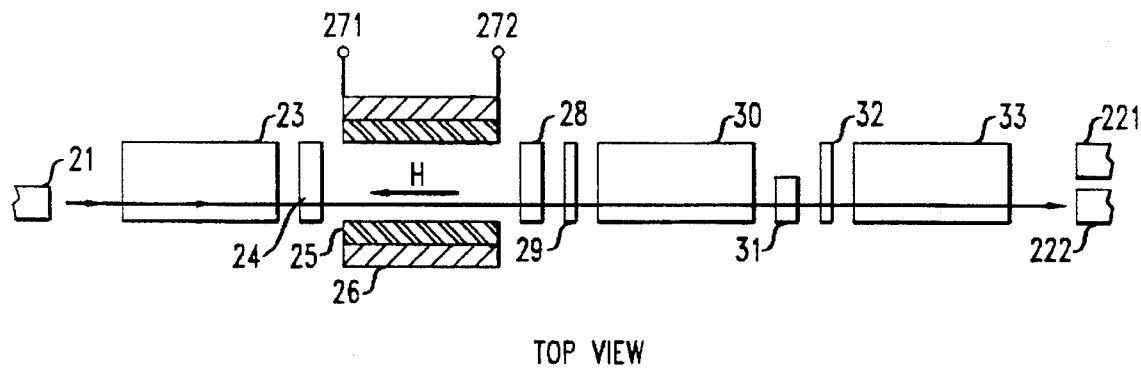
Figure 5:
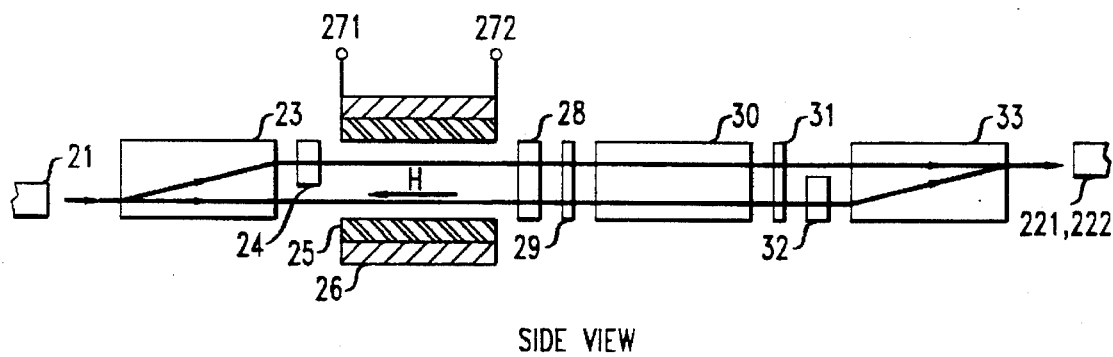

FIGS. 2 and 3 schematically depict a non-mechanical optical fiber switch according to the invention in top view and side view, respectively. The magnetic field is directed such that the radiation from the input fiber reaches one of the output fibers. FIGS. 4 and 5 schematically show the same switch, with the magnetic field directed such that the radiation reaches the other of the output fibers. Identical parts are designated by the same reference numerals in FIGS. 2–5.

Radiation propagates from input fiber 21 "downstream" to one or the other of output fibers 221 and 222. Reference numerals 23–26 refer, respectively, to the first birefringent crystal (e.g., futile), a half-aperture halfwave plate, the tubular magnet and the solenoidal switching electromagnet. Numerals 271 and 272 refer to means for electrically connecting the switching magnet to a source of switching current (not shown), exemplarily a capacitor and switch. Numerals 28–30 refer respectively to the Faraday rotator, a halfwave plate, and the second birefringent crystal, and numerals 31–33 refer, respectively, to a half-aperture halfwave plate, a further half-aperture halfwave plate, and the third birefringent crystal.

The lengths of the birefringent crystals are selected such that the desired beam displacement results. Exemplarily, the crystals are 3×3×7.5 mm rutile bodies. Halfwave plates are well known and do not require discussion. Beam transmitting surfaces typically are antireflection (AR) coated in known manner. If desired, lenses may be provided to maintain low-cross section beams.

In an exemplary embodiment the tubular magnet has 0.122 inches (3.1 mm) outer diameter, 0.082 inches (2.1 mm) inner diameter, and 0.320 inches (8.1 mm) length, and the Faraday rotator is a platelet of dimension 2.7×2.7×0.5 mm, of known composition $(Bi, Tb)_3 (Fe, Ga)_{15} O_{12}$. The tubular magnet consists of magnetically anisotropic material of the type described in U.S. Pat. 4,251,293, and will be described in more detail below.

The principle of operation of the exemplary optical fiber switch according to the invention is readily discernible from FIGS. 2–5 and the above description. Briefly, birefringent crystal 23 separates the (e.g., 1.55 μm wavelength) input beam into two beams of orthogonal polarization states. Half-aperture halfwave plate 24 rotates the polarization of one of the beams by 90°, such that both beams have the same polarization state. The beams pass through the axial bore of the tubular magnet 25 to the Faraday rotator plate 28, which rotates the polarization of both beams by plus or minus 45°, depending on the direction of the magnetic field H.

For one magnetic field direction passage through birefringent crystal 30 shifts both beams laterally the same distance, and half-aperture halfwave plates 31 and 32 shift the polarizations such that the beams again have orthogonal polarization states. Birefringent crystal 33 recombines the two beams, with one of the output fibers (e.g., 221) receiving the recombined beam.

For the other magnetic field direction, passage through birefringent crystal 30 does not result in a lateral shift of the beams. Consequently, the recombined beam that exits from birefringent crystal 33 is received by the other output fiber (e.g., 222).

Although the above description is in terms of a 1×2 switch, i.e., a switch with 1 input and 2 outputs, it will be understood that the switch could equally well be operated as a 2×1 switch, i.e., as a switch with 2 inputs and 1 output. The principles of operation for the 2×1 switch are the same as for the 1×2 switch and do not require repetition.

Switches according to the invention are advantageously (but not necessarily) used in submarine optical fiber communication systems. Not only can the switch be designed to have low profile, thereby conserving space in the repeater or amplifier housing, but the switch has no moving parts, a feature generally associated with high reliability. Furthermore, and significantly, the switch can readily be remotely controlled, facilitating switching of the light beam from a central office or other land-based control facility for beam routing purposes, emergency switching from a primary to a back-up fiber or pump laser, etc. The remote control can be implemented in conventional fashion, and exemplarily involves closing a switch such that a switching current of the desired polarity flows through the switchable magnet.

It will of course be appreciated that the switch according to the invention is not limited to submarine applications but can advantageously also be used in terrestrial applications, especially in remote, inaccessible locations.

Those skilled in the art will appreciate that the switch according to the invention does not necessarily require field input and output, but could be used to switch a free space beam of electromagnetic radiation. Furthermore, the disclosed Faraday rotator assembly is not restricted to use in an optical switch but could be used as a septate component, namely, an optical isolator. Those skilled in the art will also appreciate that the radiation paths-affecting means of the switch will frequently be combined into subassemblies for greater stability and compactness. Means for accomplishing this can be conventional. It will also be understood that n−1 switches according to the invention can be combined in series to yield a 1×n switch or a n×1 switch (n>2).

Figure 6:
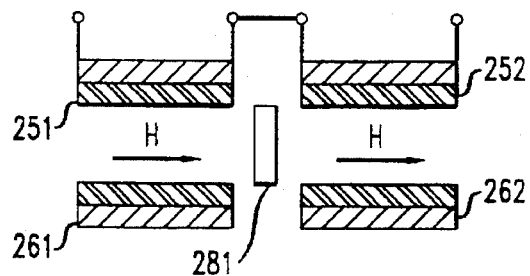
FIG. 6 schematically shows a further exemplary arrangement of magnets and Faraday rotator.

FIG. 6 shows an alternative arrangement of Faraday rotator 281 and magnet, wherein magnets 251 and 252 am used to provide the magnetic field, with solenoids 261 and 262 providing the switching field.

A significant aspect of the inventive switch is the magnet geometry which can readily be implemented in miniature form, and which provides unobstructed passage of the light beam, all facilitating a compact low profile switch design. The proximity of the switching electromagnet (solenoid) to the tubular switchable magnet is a further advantageous Feature that results in good coupling between the switching field and the tubular magnet, and in efficiency of field usage.

In preferred embodiments the material of the tubular magnet is a magnetically anisotropic Co-Cr-Fe-based alloy of the type disclosed in U.S. Pat. No. 4,251,293 and S. Jin, *IEEE Transactions on Magnetics*, Vol. MAG-15 (6), p. 1748 (1979), both incorporated herein by reference. Briefly, the alloy is subjected to continuous cooling from a temperature above the spinodal temperature $(T_s)$ to an intermediate temperature below $T_s$, the cooling resulting in formation of essentially spherical, uniformly sized particles of (Fe-rich) $\alpha_1$-phase. This is followed by (typically uniaxial) deformation of the alloy that results in an anisotropic structure, with substantially elongated particles. Finally, the alloy is subjected to a final aging treatment. Alloys of the described type are relatively ductile, and can be relatively easily deformed (e.g., by drawing) and/or machined. In particular, it is relatively easy to produce the above described tubular magnets by conventional techniques.

More specifically, alloy ingots with nominal compositions 33% Fe-7% Cr-remainder Co, and 28% Fe-7% Cr-remainder Co (all in weight %) were vacuum induction melted, homogenization annealed at about 125° C./2 hours, hot rolled, cold rolled and cold shaped into about 5.8 mm diameter rods. The rods were solution annealed at about 950° C./30 minutes and water cooled. The rods were then given initial spinodal decomposition by continuous cooling at about 4° C./hour from about 660° C. to about 585° C. and water quenched, uniaxially deformed (by swaging) by 65–70% reduction in area to about 3.3 mm diameter, and were then heat treated again by continuous cooling at 10° C./hour from about 850° C. to various final temperatures within the range 500°–565° C. and air cooled. The tubular magnets were then machined by conventional techniques. The B-H magnetization loops of the materials were obtained by using a DC field up to about 1000 Oe in a commercially available loop tracer. The magnetic properties of the 28% Cr alloy were very similar to those of the 33% Cr alloy, except that the former had slightly higher saturation induction ($B_s$) and remnant induction ($B_r$).

The above described processing resulted in material with significant shape anisotropy, with attendant relatively high $B_r$ (about 12–14 kG), coercive field Hc (about 50–1500 Oe), $B_r/B_s$ (about 0.95–0.99), and energy product $(BH)_{max}$ (about 0.1–10 MGOe).

Figure 7:
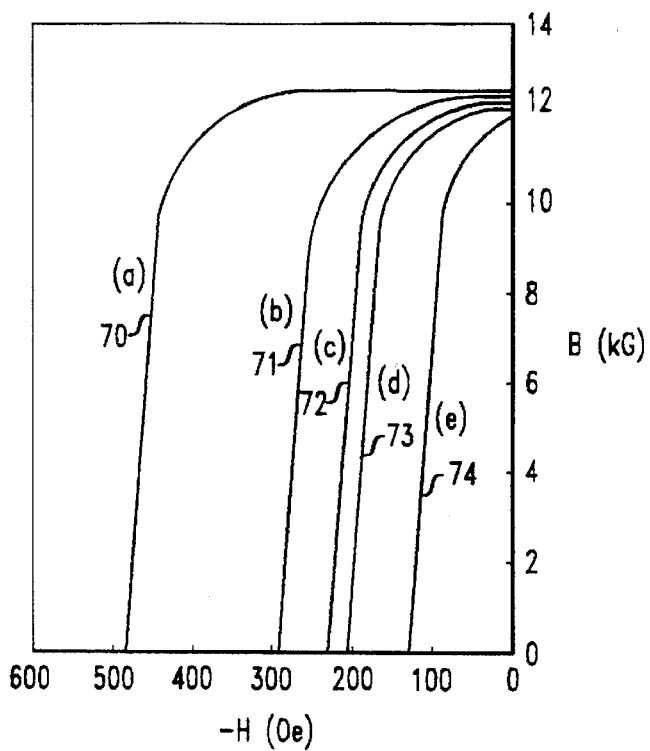
FIG. 7 shows data on magnetic properties of same samples of a magnetic alloy as a function of the final heat treatment temperature of the alloy.

The B-H loop of the material depends, inter alia, on the final heat treatment. FIG. 7 shows the relevant portion of the B-H loops of five samples of the same alloy (curves 70–74), with final heat treatment temperatures of 500° C., 520° C., 535° C., 545° C. and 555° C., respectively.

In an exemplary switch design the maximum switching field produced by the solenoid windings is in the approximate range 460–590 Oe. It is typically desirable that the switching field is substantially larger (e.g., about 2.5 times larger) than the coercive field ($H_c$) of the magnet material. Thus, a desirable $H_c$ of the magnet material of the exemplary switch is in the approximate range 180–240 Oe. Curves 72 and 73 of FIG. 7 exhibit $H_c$ in that range. Exemplarily, the alloy of curve 73 produces a residual flux of about 95 G at a Faraday rotator 28 spaced 0.7 mm from the tubular magnet in the axial direction. The residual flux is sufficient to maintain the Faraday rotation in the Faraday rotator 28, and the change in magnetic flux at the rotator that results from application of a current pulse (e.g., by means of a capacitor discharge) to the switching magnet is sufficient to switch the state of the Faraday rotator.

Use of the described deformation-aged Co-Cr-Fe-based alloy for the tubular switchable magnet offers advantages and is preferred. The alloy is readily machinable and thus facilitates manufacture of the desired miniature tubular shape. This is in contrast to other known magnet materials with high remnant induction, which frequently are brittle and difficult to deform or machine.

The high squareness of the B-H loop, and consequent high flux density, is another advantageous feature of the preferred alloy, which facilitates miniaturization of the optical switch because a smaller magnet volume can be used to obtain the same value of magnetic flux, as compared to many other magnet materials.

In view of cost and ductility considerations, the Co-content of the magnet alloys is typically in the range 3–12 wt. preferably 3–8 wt. %. The Cr content typically is in the range 20–40 wt. %, preferably 25–35 wt. %. The remainder is largely or completely Fe, with at most 6 wt. % of elements other than Co, Cr and Fe.

Figure 8:
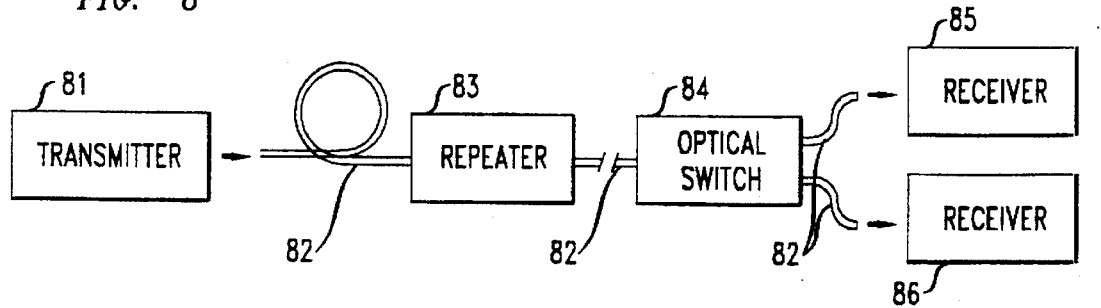
FIGS. 8 and 9 schematically depict exemplary optical fiber communication systems that comprise a switch according to the invention.

FIG. 8 schematically depicts an article according to the invention, namely, an optical field communication system 80 that a remotely controllable non-mechanical optical fiber switch according to the invention. Transmitter 81 generates an optical signal in response to an input. The signal is coupled into optical fiber 82 and transmitted therethrough (typically with amplilication in one or more spaced apart repeaters). An optical switch (84) according to the invention is provided in a FSBU (fiber switched branching unit) to route the signal to one or the other of receivers 85 or 86. It will be appreciated that many variations of the depicted system are possible. For instance, the switch could be incorporated into a repeater housing instead of being provided in a separate unit. It will also be understood that a switch according to the invention can readily be designed for a wavelength other than 1.55 μm, e.g., for pump radiation of approximate wavelength 1.49 μm.

Figure 9:
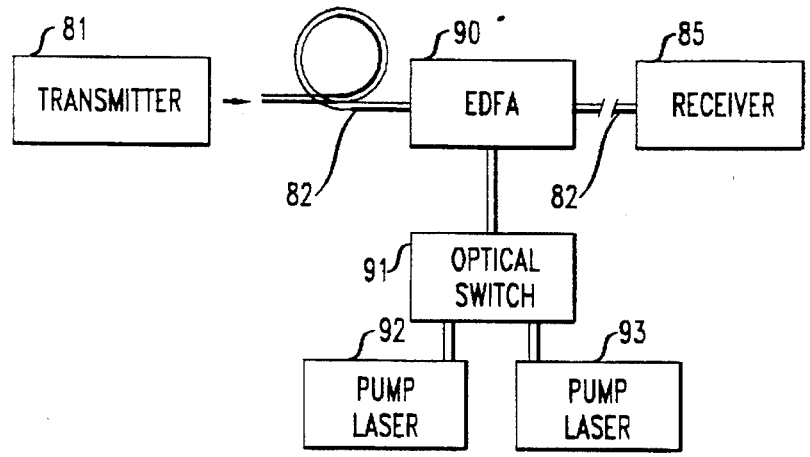

FIG. 9 schematically shows another exemplary article according to the invention, namely, an optical fiber communication system with one (or more) in-line optical fiber amplifiers 90 (typically erbium-doped fiber amplifiers or EDFAs). The amplifier fiber is pumped with radiation from pump laser 92, with stand-by pump laser 93 provided. Optical switch 91 is a switch according to the invention that facilitates switching from pump laser 92 to 93. The switch could receive a switching signal from a terminal of the system, or could receive a locally generated switching signal upon detection of a pump laser failure by local monitoring means. Such schemes are known and do not require elaboration.

The invention claimed is:

1. An article comprising a non-mechanical optical fiber switch for radiation-transmissively connecting a switch port of a first type with one of two switch ports of a second type, said switch ports of the second type being spaced from each other and are facing the switch port of the first type, the optical fiber switch further comprising radiation path-affecting means disposed between said switch ports of the first and second types, the radiation path-affecting means being effective for switchably directing radiation between the switch port of the first type and one or the other of the switch porks of the second type, and comprising a magneto-optic element and a magnet effective for applying a magnetic field to the magneto-optic element;

CHARACTERIZED IN THAT a) the magnet is a tubular magnet having an axial bore, the magnet disposed such that the radiation paths between said switch port of the first type and said switch ports of the second type pass through the axial bore;

b) the magneto-optic element is disposed outside of the bore of the magnet; and c) the magnet comprises magnetically anisotropic material having, at 20° C., a coercivity $H_c$ in the range 100–300 Oe and a remanent induction $B_r$ of at least 10 kG.

2. Article according to claim 1, wherein the switch port of the first type is an input fiber port, and the switch ports of the second type are output fiber ports.

3. Article according to claim 1, wherein the switch port of the first type is an output fiber port, and the switch ports of the second type are input fiber ports.

4. Article according to claim 1, wherein the magnetically anisotropic material comprises Fe, between 3 and 8 weight percent Co, between 25 and 35 weight % Cr, and at most 6 weight percent elements other than Co, Cr and Fe.

5. Article according to claim 1, wherein the tubular magnet has a length/outside diameter ratio >2.

6. Article according to claim 1, comprising a further tubular magnet with axial bore, with the magneto-optic element disposed between the tubular magnet and the further tubular magnet.

7. Article according to claim 2, wherein the article is an optical fiber communication system that comprises a at least one transmitter, at least one receiver, an optical transmission path signal-transmissively connecting at least one transmitter and the at least one receiver, the optical transmission path comprising optical fiber, and further comprising said non-mechanical optical fiber switch.

8. Article according to claim 3, wherein the article is an optical fiber communication system that comprises a transmitter, a receiver, an optical transmission path signal-transmissively connecting the transmitter and the receiver, the optical transmission path comprising an optical fiber amplifier, the article further comprising a first and a second pump laser, and means for coupling pump radiation into the optical fiber amplifier, said means comprising said non-mechanical optical fiber switch.

9. Article according to claim 1, wherein the tubular magnet is disposed within a solenoidal electromagnet, and wherein the article further comprises means for controllably flowing a switching current through the solenoidal electromagnet.

10. Article according to claim 9, wherein the means for controllably flowing a switching current comprise a charge-storage capacitor and a switch that facilitates discharging the capacitor.

11. Article according to claim 10, wherein said switch that facilitates discharging the capacitor is operable from a distant location.

12. Article according to claim 10, wherein said switch that facilitates discharging the capacitor is responsive to locally disposed sensing means.

* * * * *